(12) United States Patent
Fang et al.

(10) Patent No.: US 10,015,848 B2
(45) Date of Patent: Jul. 3, 2018

(54) PRIMARY SIDE CONTROLLED LED DRIVER WITH RIPPLE CANCELLATION

(71) Applicant: Queen's University at Kingston, Kingston (CA)

(72) Inventors: Peng Fang, Kingston (CA); Yan-Fei Liu, Kingston (CA)

(73) Assignee: Queen's University at Kingston, Kingston (CA)

( * ) Notice: Subject to any disclaimer, the term of this patent is extended or adjusted under 35 U.S.C. 154(b) by 0 days.

(21) Appl. No.: 15/125,271

(22) PCT Filed: Mar. 13, 2015

(86) PCT No.: PCT/CA2015/000172
§ 371 (c)(1),
(2) Date: Sep. 12, 2016

(87) PCT Pub. No.: WO2015/135073
PCT Pub. Date: Sep. 17, 2015

(65) Prior Publication Data
US 2017/0079095 A1 Mar. 16, 2017

Related U.S. Application Data

(60) Provisional application No. 61/953,264, filed on Mar. 14, 2014.

(51) Int. Cl.
*H05B 37/02* (2006.01)
*H05B 33/08* (2006.01)
(Continued)

(52) U.S. Cl.
CPC .......... *H05B 33/0809* (2013.01); *H02M 1/14* (2013.01); *H02M 1/143* (2013.01);
(Continued)

(58) Field of Classification Search
CPC ............ H05B 33/0809; H05B 33/0815; H05B 33/0845; H05B 33/0842; H05B 33/0884;
(Continued)

(56) References Cited

U.S. PATENT DOCUMENTS 5,668,708 A 9/1997 Scapellati
7,315,150 B1 1/2008 Coleman
(Continued)

FOREIGN PATENT DOCUMENTS

WO WO2013/056356 A1 4/2013

OTHER PUBLICATIONS

International Search Report for International Application No. PCT/CA2015/000172 filed on Mar. 13, 2015.
(Continued)

*Primary Examiner* — Henry Luong
(74) *Attorney, Agent, or Firm* — Stephen J. Scribner

(57) ABSTRACT

Described herein are methods and circuits for improving the performance of an AC to DC power supply. The methods and circuits achieve high power factor (PF) at the AC side and at the same time, reduce or substantially eliminate ripple in the DC output power. The methods and circuits provide an isolated topology including primary side voltage and current sensing and primary side ripple cancellation control. The methods and circuits may be used in any application where high power factor and/or low output ripple are required. In particular, the methods and circuits may be used in DC lighting applications, such as in light emitting diode (LED) lighting, wherein suppression of low frequency ripple in the output power eliminates visible flickering.

17 Claims, 16 Drawing Sheets

(51) Int. Cl.
*H02M 1/14* (2006.01)
*H02M 1/42* (2007.01)
*H02M 1/00* (2006.01)

(52) U.S. Cl.
CPC ............ *H02M 1/42* (2013.01); *H02M 1/4258* (2013.01); *H05B 33/0815* (2013.01); *H05B 33/0845* (2013.01); *H02M 2001/0093* (2013.01); *Y02B 70/126* (2013.01)

(58) Field of Classification Search
CPC .......... H02M 1/14; H02M 1/143; H02M 1/42; H02M 1/4208; H02M 1/425; H02M 1/4258
See application file for complete search history.

(56) References Cited

U.S. PATENT DOCUMENTS

| | | | |
|---|---|---|---|
| 8,300,438 B1 * | 10/2012 | Herbert | H02M 1/4216 363/124 |
| 9,419,510 B2 | 8/2016 | Liu | |
| 2005/0231133 A1 * | 10/2005 | Lys | F21S 48/325 315/291 |
| 2012/0119676 A1 * | 5/2012 | Yao | H01F 38/42 315/297 |
| 2013/0313991 A1 | 11/2013 | Pan et al. | |
| 2014/0049990 A1 * | 2/2014 | Limpaecher | H02M 3/24 363/15 |

OTHER PUBLICATIONS

Written Opinion for International Application No. PCT/CA2015/000172 filed on Mar. 13, 2015.

Fang, P., et al., "Zero Ripple Single Stage AC-DC LED Driver with Unity Power Factor", IEEE, pp. 3452-3458, (2013).

Xie, X., et al., "A Novel Output Current Estimation and Regulation Circuit for Primary Side Controlled High Power Factor Single-Stage Flyback LED Driver", IEEE Transactions on Power Electronics, vol. 27, No. 11, pp. 4602-4612, (2012).

* cited by examiner

PRIMARY SIDE CONTROLLED LED DRIVER WITH RIPPLE CANCELLATION

FIELD

This invention relates to methods and circuits for improving the performance of an AC to DC power supply. In particular, methods and circuits are provided for power supplies that achieve high power factor (PF) at the AC side and at the same time, reduce or substantially eliminate ripple in the DC output power. The methods and circuits may be used in any application where high power factor and/or low output ripple are required. In particular, the methods and circuits may be used in DC lighting applications, such as in light emitting diode (LED) lighting, wherein suppression of low frequency ripple in the output power eliminates visible flickering.

BACKGROUND

Regulation concerning power factor correction for a wide range of devices is becoming increasingly stringent. For example, new regulation requires power factor correction for any light emitting diode (LED) power supply with output power higher than 5 W.

For low to medium power level (e.g., 5 W to 100 W), a flyback converter is often used. By forcing the average input current to follow the input voltage, high power factor can be achieved. In order to reduce the cost, critical conduction mode is often used to achieve power factor correction. However, this results in a ripple in the output voltage at harmonics of the line frequency. The second harmonic (e.g., 120 Hz for North America or 100 Hz for China, Europe) is of particular concern for DC lighting applications, such as LED lighting, as it results in visible flickering wherein the human eye can see fluctuation of the light emitting from the LED.

Despite concerns over visible flicker in the output light, LED lighting is becoming an important light source due to high lighting efficiency and long life span. A two-stage LED driver may achieve substantially flicker-free performance, but at the expense of lower efficiency and higher component cost. A single-stage LED driver is therefore desirable because of its high efficiency and low component cost.

SUMMARY

Ripple cancellation converter embodiments described herein include one or more of the following features:
  Isolated topology.
  Primary side control of ripple cancellation and load current regulation.
  Primary side sensing of the power factor correction (PFC) output, ripple cancellation converter output, and load current.
  Ripple cancellation is achieved at the secondary side, resulting in a DC output voltage or a DC output current.
  Reduced design complexity and component cost, relative to prior designs.

According to one aspect of the invention, there is provided a circuit for use with a power supply including a primary input side and a secondary output side that provides a main output including a main DC voltage with a first AC voltage ripple or a main DC current with a first AC current ripple, the circuit comprising: a primary side controlled isolated ripple cancellation converter that: (i) senses the first AC voltage ripple from the primary side; and uses the sensed AC voltage ripple to provide a second AC voltage ripple; wherein the second AC voltage ripple is connected in series with the main output, such that the first AC voltage ripple is substantially cancelled; or (ii) senses the first AC current ripple from the primary side; and uses the sensed AC current ripple to provide a second AC current ripple; wherein the second AC current ripple is connected in parallel with the main output, such that the first AC current ripple is substantially cancelled; Wherein substantially ripple-free DC output power is provided to a load.

According to another aspect of the invention, there is provided a power supply that provides DC power, comprising: a power circuit that outputs a main DC voltage with a first AC voltage ripple or a main DC current with a first AC current ripple; and the circuit described above.

In some embodiments, the ripple cancellation converter provides an auxiliary output comprising: (i) an auxiliary DC voltage with the second AC voltage ripple, wherein the second AC voltage ripple is substantially equal in magnitude and substantially opposite in phase to the first AC voltage ripple; wherein the main output and the auxiliary output are combined such that: a total DC voltage is provided; the second AC voltage ripple substantially cancels the first AC voltage ripple, or the total DC voltage is substantially ripple-free; or (ii) an auxiliary DC current with the second AC current ripple, wherein the second AC current ripple is substantially equal in magnitude and substantially opposite in phase to the first first AC current ripple; wherein the main output and the auxiliary output are combined such that: a total DC current is provided; the second AC current ripple substantially cancels the first AC current ripple, or the total DC current is substantially ripple-free.

In some embodiments, the ripple cancellation converter comprises a flyback converter or an isolated boost converter.

In some embodiments, the circuit further comprises: a first primary side sensor that senses the first AC voltage ripple and outputs a first sensor signal; a second primary side sensor that senses the second AC voltage ripple and outputs a second sensor signal; and a primary side ripple cancellation controller that uses the first and second sensor signals to control the ripple cancellation converter to shape the second AC voltage ripple.

In some embodiments, the circuit further comprises a power factor correction circuit.

In some embodiments, operation of the power factor correction circuit is based on a feedback signal derived from a primary side load current sensor.

In some embodiments, the substantially ripple-free DC output power is variable.

In some embodiments, the load comprises at least one LED.

According to another aspect of the invention, there is provided a method for providing DC power from a main output power comprising a main DC voltage with a first AC voltage ripple or a main DC current with a first AC current ripple, the method comprising: controlling an isolated ripple cancellation converter from a primary side, wherein controlling comprises: (i) sensing the first AC voltage ripple from the primary side; and using the sensed AC voltage ripple to provide a second AC voltage ripple; wherein the second AC voltage ripple is connected in series with the main output, such that the first AC voltage ripple is substantially cancelled; or (ii) sensing the first AC current ripple from the primary side; and using the sensed AC current ripple to provide a second AC current ripple; wherein the second AC current ripple is connected in parallel with the main output, such that the first AC current ripple is substantially cancelled; wherein substantially ripple-free DC output power is provided to a load.

The method may further comprise: (i) controlling the isolated ripple cancellation converter to output an auxiliary DC voltage with the second AC voltage ripple, wherein the second AC voltage ripple is substantially equal in magnitude and substantially opposite in phase to the first AC voltage ripple; and combining the main output and the auxiliary output such that: a total DC voltage is provided; the second AC voltage ripple substantially cancels the first AC voltage ripple, or the total DC voltage is substantially ripple-free; or (ii) controlling the isolated ripple cancellation converter to output an auxiliary DC current with the second AC current ripple, wherein the second AC current ripple is substantially equal in magnitude and substantially opposite in phase to the first first AC current ripple; and combining the main output and the auxiliary output such that: a total DC current is provided; the second AC current ripple substantially cancels the first AC current ripple, or the total DC current is substantially ripple-free.

The method may further comprise: using a first primary side sensor to sense the first AC voltage ripple and output a first sensor signal; using a second primary side sensor to sense the second AC voltage ripple and output a second sensor signal; and using a primary side ripple cancellation controller to shape the second AC voltage ripple based on the first and second sensor signals.

The method may further comprise: using a primary side current sensor to sense the load current and output a feedback signal; and controlling operation of a power factor correction circuit based on the feedback signal.

The method may comprise providing variable substantially ripple-free DC output power.

The method may comprise providing substantially ripple-free DC output power to at least one LED.

BRIEF DESCRIPTION OF THE DRAWINGS

For a better understanding of the invention, and to show more clearly how it may be carried into effect, embodiments will be described, by way of example, with reference to the accompanying drawings, wherein.

DETAILED DESCRIPTION OF EMBODIMENTS

Figure 1:
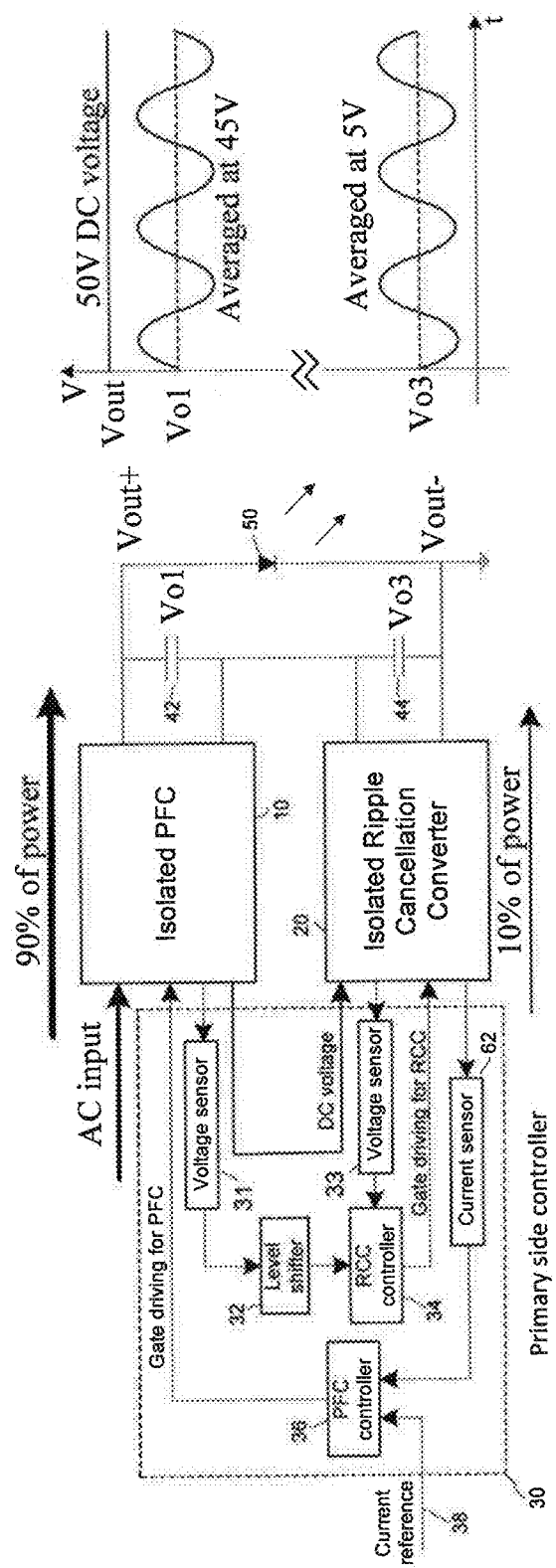
FIG. 1 is a diagram of a generalized embodiment.

Provided herein are AC to DC power supply methods and circuits that provide substantially ripple-free output power to a load and achieve high power factor. The methods and circuits provided herein may be used in any power supply application where substantially ripple-free output power and high power factor are desirable, such as, but not limited to, computers, tablets, cell phones, etc. Embodiments are described primarily with respect to lighting applications, e.g., wherein the load is an LED; however, it is to be understood that they are not limited thereto.

For the sake of brevity, the term "LED" as used herein is intended to refer to a single LED or to multiple LEDs electrically connected together (e.g., in a series, parallel, or series-parallel arrangement). It will be appreciated that an LED lighting fixture (e.g., an LED lamp) may include a single LED or multiple LEDs electrically connected together.

The methods and circuits achieve high power factor (PF) at the AC side and reduce or substantially eliminate ripple in the DC output power. The ripple may be a harmonic of the line frequency, such as the second harmonic (e.g., 120 Hz for North America or 100 Hz for China, Europe) of the line frequency. In DC lighting (e.g., LED) applications, ripple at the $2^{nd}$ harmonic results in visible flickering, wherein the human eye can see fluctuation of the light emitting from the LED. Therefore, of particular interest for lighting applications is suppression or elimination of ripple at the $2^{nd}$ harmonic. The methods and circuits described herein reduce or substantially eliminate ripple at the second harmonic and at other harmonics. Further, because the methods and circuits described herein provide primary side control, they can be implemented in a way that minimizes component counts, providing power supplies that are compact and cost effective. For example, they can be implemented in an integrated circuit (IC) technology wherein the primary side controller is substantially or entirely provided in an IC. However, embodiments may be implemented in any currently-available semiconductor technology, which may include a hybrid circuit comprising one or more IC component together with discrete components.

Provided herein are circuits and methods for use with a power supply that provides a main output including a main DC voltage having a first AC voltage ripple, or a main DC current having a first AC current ripple. The methods and circuits include a primary side ripple cancellation converter (RCC). The ripple cancellation converter (i) provides a second AC voltage ripple connected in series with the main output, such that the first AC voltage ripple is substantially cancelled; or (ii) provides a second AC current ripple connected in parallel with the main output, such that the first AC current ripple is substantially cancelled. As a result, substantially ripple-free DC output power is provided.

A primary side controlled ripple cancellation LED driver circuit as described herein provides advantages including high efficiency, low component cost, and flicker-free LED driving. Primary side controller embodiments are suitable for IC implementation, which greatly reduces component cost and design complexity relative to ripple cancellation LED drivers that have previously been proposed.

For example, a prior ripple cancellation LED driver may require several integrated circuits to construct the control circuit, a PFC controller, operation amplifiers for the voltage sensing circuit and secondary side compensation circuit), a Buck regulator (for the ripple cancellation converter) and an opto-coupler for isolation. These components contribute substantially to the overall cost.

As noted above, a feature of the embodiments described herein is that the control circuit is implemented on the primary side. This isolates the primary and secondary sides, thereby eliminating the need for an isolating device such as an opto-coupler. This also makes it possible to implement the control circuit on a single IC, whereas integrated circuit implementation of prior designs, which have control elements on the secondary side, require ICs on both the primary and secondary sides. Accordingly, the embodiments described herein are able to reduce complexity and component count, and hence cost of the driver.

FIG. 1 is a diagram of a generalized embodiment. As shown in FIG. 1, an isolated power factor correction (PFC) circuit 10 outputs voltage Vo1 and an isolated ripple cancellation converter 20 outputs voltage Vo3. The output voltages Vo1 and Vo3 are connected in series with the load 50, which may be an LED. Output storage capacitors 42, 44 are shown for Vo1 and Vo3, respectively. Both output voltages contain low frequency ripple, however, the ripples are substantially out of phase with each other, such that they cancel each other. Two key tasks need to be done in order to achieve the ripple voltage cancellation and LED current regulation. First, the low frequency ripple of PFC output Vo1 and the output voltage Vo3 of the ripple cancellation converter need to be sensed, and this information used to shape the ripple cancellation converter output Vo3. Second, the LED current must be sensed and compared to a reference current to achieve current regulation. These two tasks are achieved at the primary side using a controller 30. It will be appreciated that such an embodiment may be implemented using only one integrated circuit (i.e., a primary side controller IC), as, for example, an application-specific integrated circuit As illustrated in FIG. 1, the primary side controller 30 includes a first voltage sensor 31 and a second voltage sensor 33, that sense the PFC output and the RCC output, respectively, at the primary side. A level shifter 32 and a voltage controller 34 are also included in controller 30 so that the voltage control loop for the RCC output Vo3 is implemented at the primary side and Vo3 can be shaped as desired to match the ripple in Vo1. The primary side controller 30 also includes components such as a PFC controller 36 and a load (LED) current sensor 62. The current sensor output is compared with a current reference 38 in the PFC controller 36 to achieve load current regulation.

Detailed Operating Principle

Key features of an exemplary embodiment, based on a flyback topology, including power structure, PFC and ripple cancellation converter voltage sensing, LED current sensing, and control circuit will now be described in detail.

However, it will be appreciated that the invention is not limited thereto, as the PFC and ripple cancellation converter may be implemented with other isolated power topologies, such as, for example, isolated boost, where the sensing of secondary side output voltage and LED current may need to vary accordingly.

Power Structure

Figure 2:
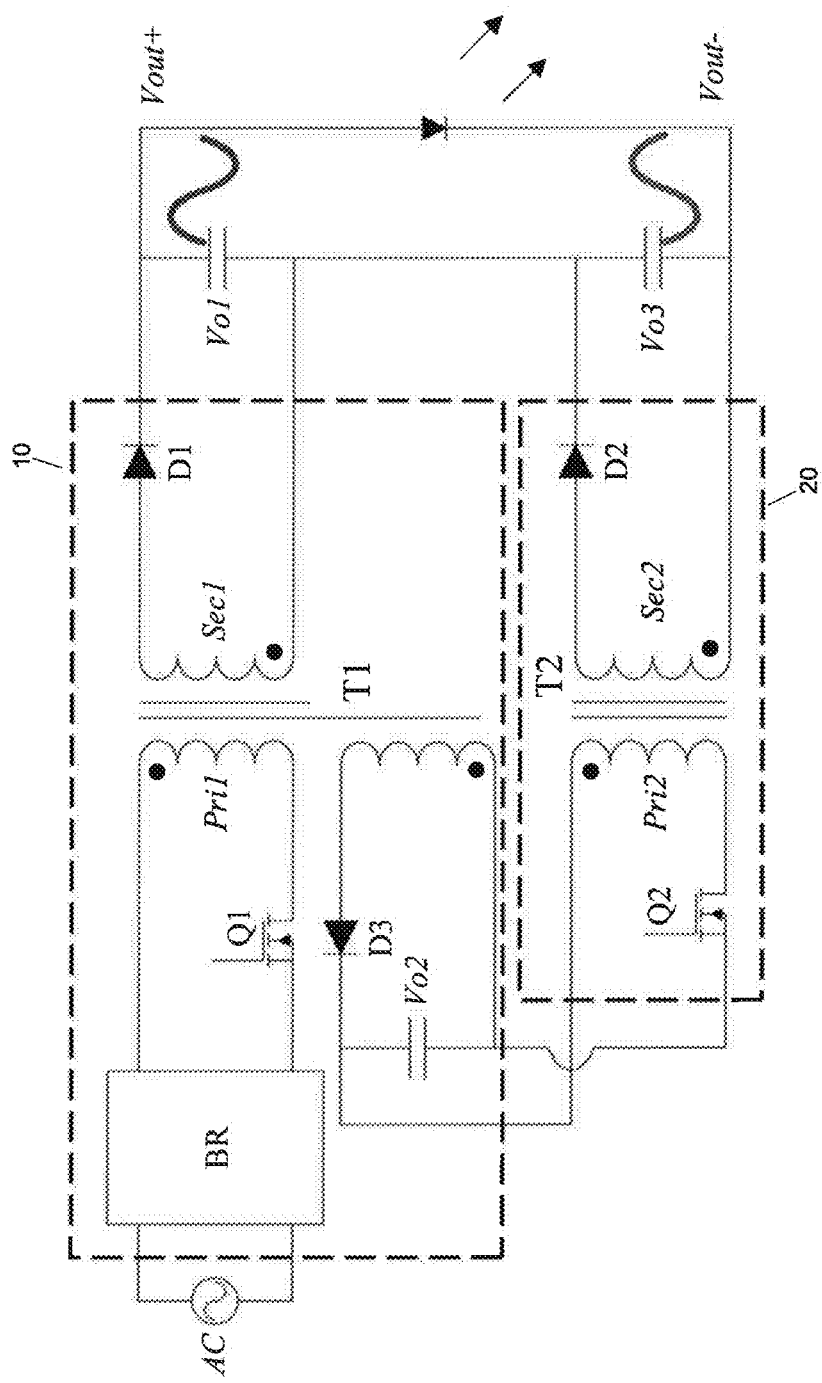
FIG. 2 is a diagram of the power stage of a ripple cancellation converter according to one embodiment.

As an example, FIG. 2 shows the power stage 10 constructed using flyback topology for the PFC and the ripple cancellation converter 20.

The LED voltage, Vout, is produced by connecting the flyback PFC output Vo1 and the ripple cancellation converter output Vo3 in series. The input DC voltage, Vo2, for the ripple cancellation converter is produced at the primary side by the flyback PFC.

The flyback PFC output voltage Vo1 contains a significant low frequency ripple component. The voltage Vo1 can be described by equation (1):

$$V_{o1} = V_{o1\_dc} + V_{o1\_rip}(t) \qquad (1)$$

In equation (1), Vo1_dc represents the DC component of Vo1 while Vo1_rip(t) represents its low frequency ripple component. The ripple cancellation converter output Vo3 also contains a significant low frequency ripple component and is described by equation (2):

$$V_{o3} = V_{o3\_dc} + V_{o3\_rip}(t) \qquad (2)$$

The DC component Vo3_dc is needed to maintain Vo3 above zero. The purpose of connecting voltage Vo1 and Vo3 in series is to have their ripple component canceled. As such, their sum, Vout, is a DC value and is described by equation (3):

$$V_{out} = V_{o1} + V_{o3} \qquad (3)$$
$$= (V_{o1\_dc} + V_{o3\_dc}) + [V_{o1\_rip}(t) + V_{o3\_rip}(t)]$$

As can be seen from equation (3), in order to achieve total low frequency ripple cancellation, the following equation must be satisfied:

$$V_{o1\_rip}(t) + V_{o3\_rip}(t) = 0 \qquad (4)$$

Equation (4) requires that Vo1_rip(t) and Vo3_rip(t) are of equal value but with opposite sign. In this disclosure, Vo1_rip(t) is the master signal and Vo3_rip(t) is its dependent follower.

Primary Side Voltage Sensing

Figure 3A:
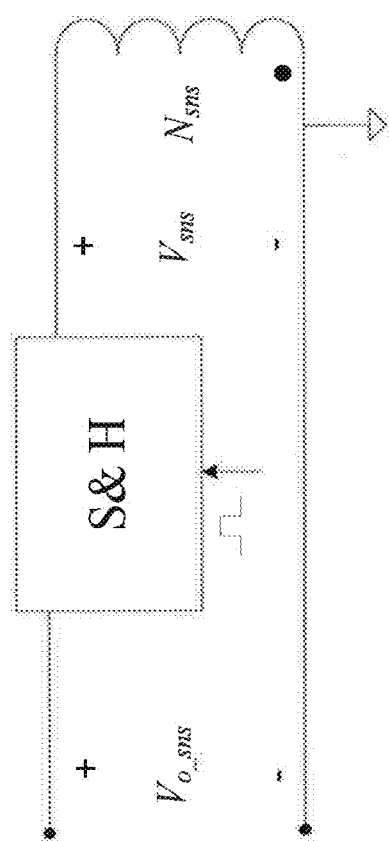
FIG. 3A is a diagram showing a generalized a technique for primary side voltage sensing.
Figure 3B:
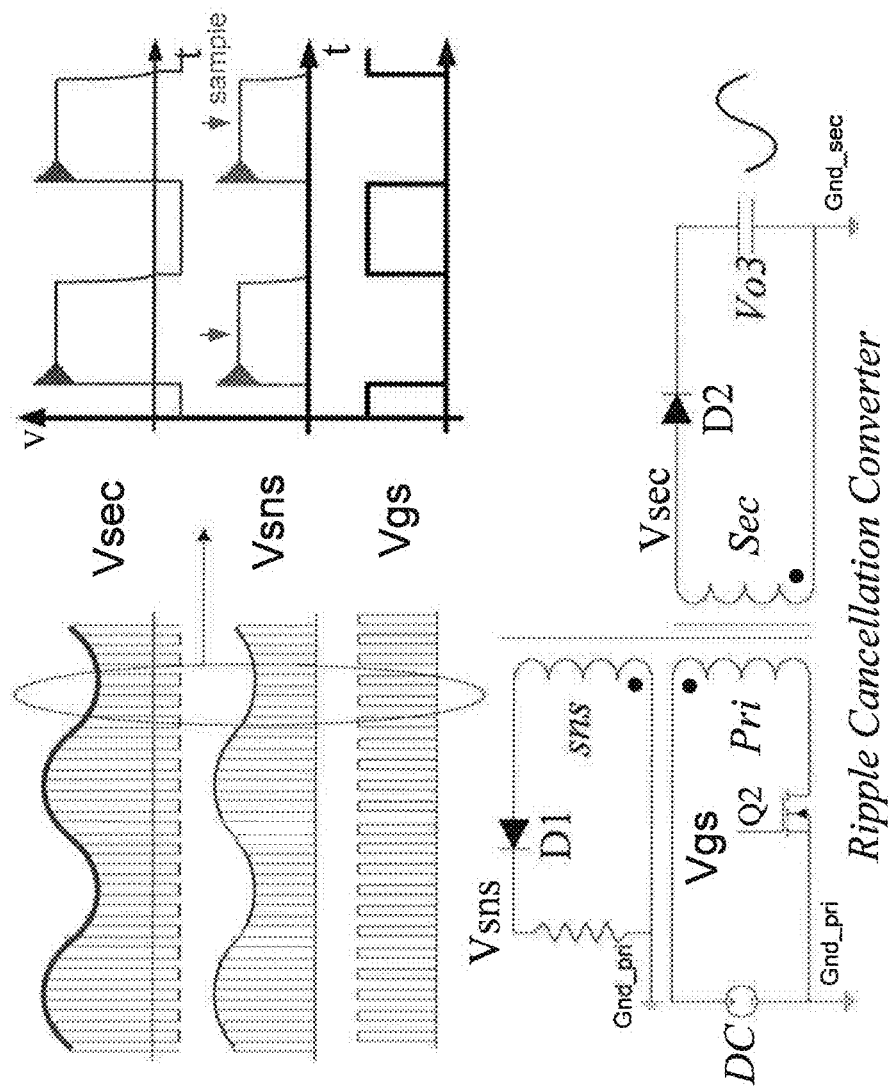
FIG. 3B is a diagram showing a technique for primary side voltage sensing according to one embodiment, and key voltage waveforms.

In order to shape the ripple cancellation converter output Vo3, both Vo1 and Vo3 need to be sensed at the primary side. FIG. 3A shows a generalized embodiment of primary side voltage sensing employing a sample and hold (S&H) technique. Such primary side voltage sensing may be used for the voltage sensors 31 and 33 (FIG. 1). An a more detailed embodiment is shown in FIG. 3B, wherein waveforms of the voltage on the secondary side winding Vsec, the voltage on the primary side sensing winding Vsns, and the gating signal Vgs are illustrated.

In this example, for a flyback topology based power converter, when Q2 is turned off, both diodes D1 and D2 conduct. Therefore, the voltage across the secondary side winding, Vsec, is equal to the output voltage Vo3 (D2 forward voltage drop has been ignored). The sensed voltage Vsns and the secondary side voltage Vsec have a proportional relationship. This relationship is determined by the transformer turns ratio and is described by equation (5):

$$V_{sns} = \frac{N_{sns}}{N_{sec}} \cdot V_{Sec} \quad (5)$$

In equation (5), Nsns and Nsec represent he turns of the primary side sensing winding and the secondary side winding, respectively. Therefore, the output voltage of the flyback converter can be sensed at primary side. Similarly, the flyback PFC output voltage can also be sensed at primary side in the same way. In order to produce a continuous sensed voltage at the primary side instead of a pulsating value, the sensed voltage may be sampled during the Q2 turn off period while D2 is still conducting as shown in FIG. 3B. For practical concerns, the voltage sampling should be timed to avoid excessive voltage ringing, as typically occurs right after Q2 turns off, as shown by the arrows labelled "sample" in the plot of Vsns in FIG. 3B.

Figure 3C:
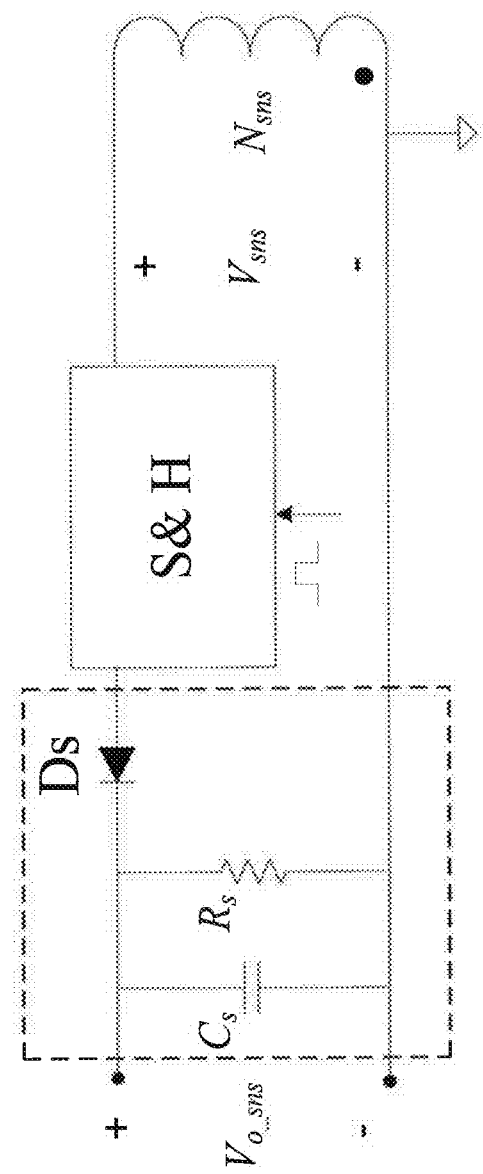
FIG. 3C is a diagram showing a technique for primary side voltage sensing according to another embodiment.

However, for the flyback PFC, during the zero crossing of the input voltage and current, the voltage on the sensing winding is distorted, As a result, the output of the voltage sensing is also distorted. Therefore, a modified primary side voltage sensing circuit such as that shown in FIG. 3C may be used. This embodiment adds a diode Ds, a capacitor Cs, and a resistor Rs to the sensing circuit, to filter out the sensed distortion. The embodiment of FIG. 3C may be particularly useful for the flyback PFC voltage sensor 31.

Primary Side Current Sensing

Figure 4:
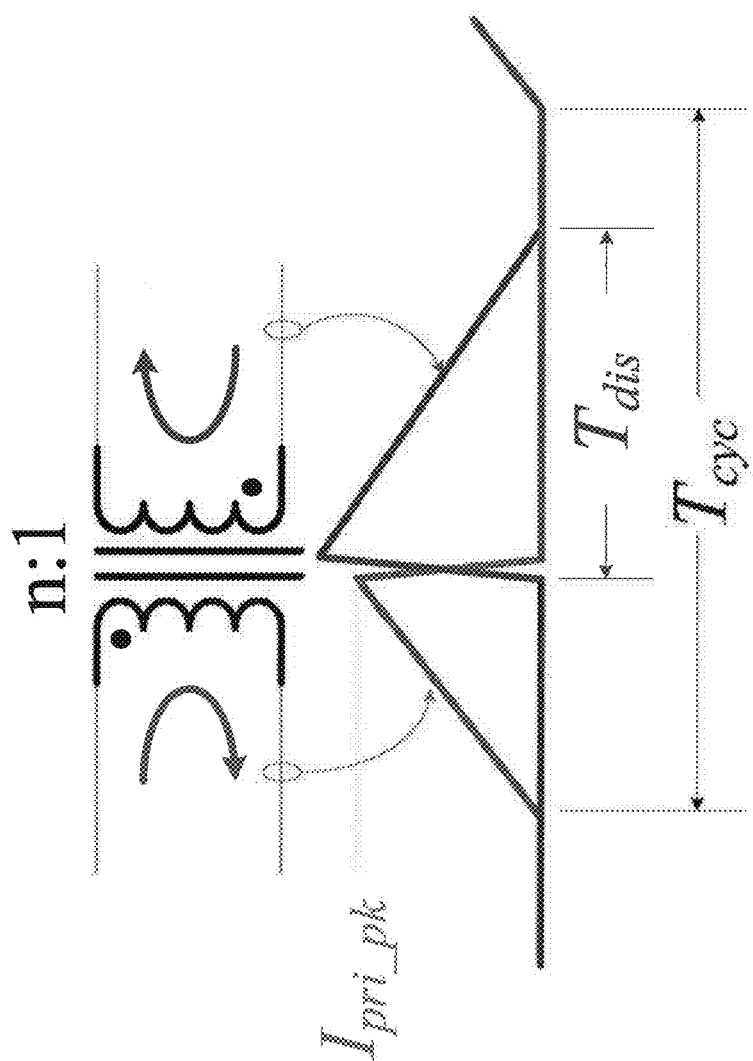
FIG. 4 is a diagram showing a technique for primary side current sensing according to one embodiment.

The load current is also sensed at the primary side, An example of a suitable technique is shown in FIG. 4. The average current flow into the secondary side during a switching period may be described by equation (6):

$$I_{sec\_avg} = \frac{n \times I_{pri\_pi} \times T_{dis}}{2 \times T_{cyc}} \quad (6)$$

In equation (6), n represents the turn ratio (Npri:Nsec) of the primary side and the secondary side windings. Ipri_pk is the peak switching current at the primary side, Tdis and Tcyc represent the secondary side current discharge time and the whole switching period respectively. Ipri_pk and Tdis can be sensed at primary side. Tcyc is a known parameter predetermined by design. Thus, the average secondary side current at the primary side can be determined.

Current Regulation Loop

Figure 5:
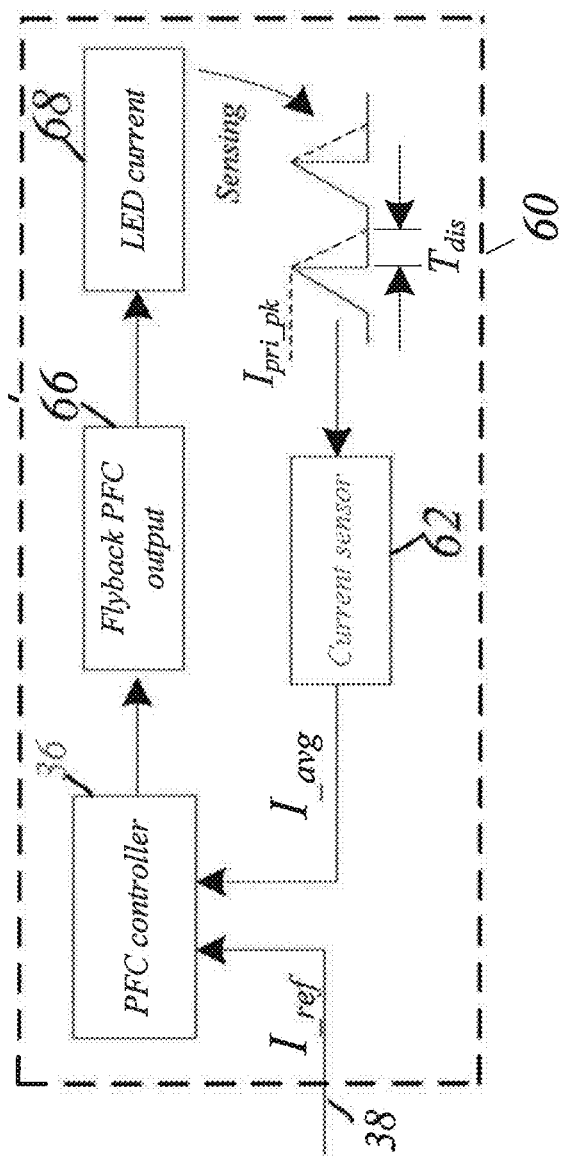
FIG. 5 is a diagram of a load current regulation loop according to one embodiment.

As discussed above, the average LED current is determined at the primary side. FIG. 5 is a diagram of a load current regulation loop 60 according to one embodiment, Such an embodiment may be implemented in the primary side controller 30 (FIG. 1). The embodiment includes an average current sensor 62, PFC controller 36 that receives the calculated average current I_avg and compares it with the current reference Iref_38. The PFC. controller 36 adjusts the output voltage of the flyback PFC 66. Thus, the LED current 68 may be regulated automatically.

Output Ripple Shaping for Ripple Cancellation Converter

Figure 6:
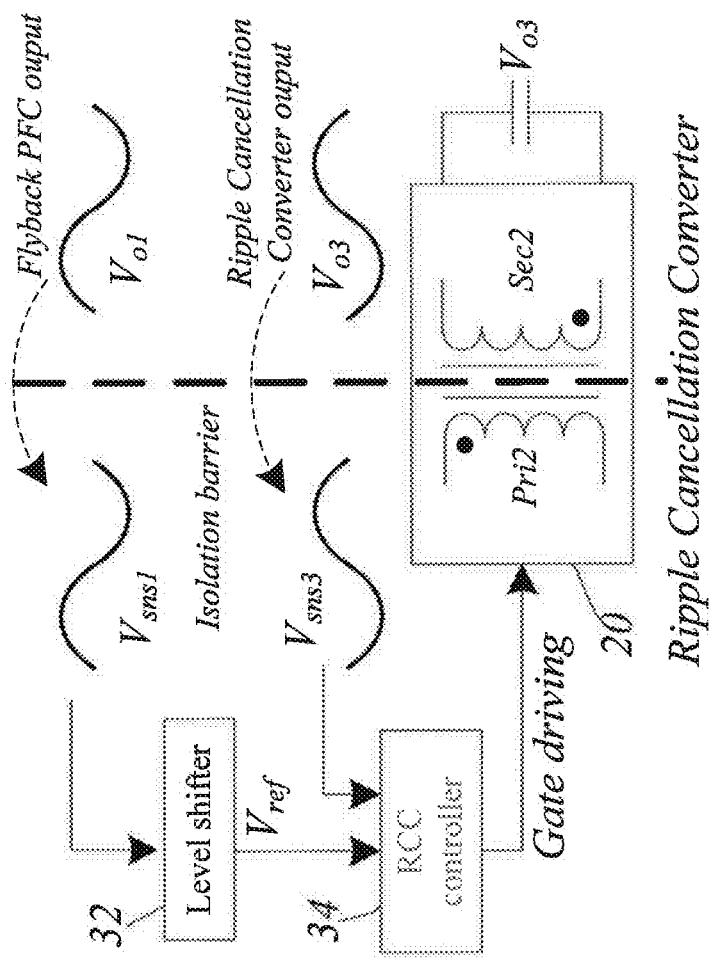
FIG. 6 is a diagram showing a technique for shaping the ripple cancellation converter output, according to one embodiment.

FIG. 6 is a simplified diagram showing shaping of the ripple cancellation converter output Vo3. Such an embodiment may be implemented in the primary side controller 30 (FIG. 1). The figure shows primary side sensing of the flyback PFC 10 output Vo1 and the ripple cancellation converter 20 output Vo3 at the primary side, across the isolation barrier (dashed line) provided by the transformer. The technique may include components such as a level shifter 32 and voltage regulator 34. With proper signal conditioning of Vsns1, the reference voltage Vref for the ripple cancellation converter is produced. The output voltage of the ripple cancellation converter Vo3 is then shaped to cancel low frequency ripple in Vo1.

Variable Output Power

In some applications it might be desirable to vary (e.g., control) the output power of the converter. For example, in LED lighting applications, dimming of the LED may be required. The term "dimming" means that the light output of the LED is adjustable or variable. Some applications may require that the LED light is adjustable from 100% to 1%. Dimming may be achieved according to several techniques. In one such technique the load current is adjustable. For example, this may be achieved by controlling (e.g., varying) the output reference signal I_ref. Other techniques may include controlling the output power between two different levels according to, e.g., a variable duty cycle.

Features

High efficiency

As shown in FIG. 1, the averaged voltage of Vo1 and Vo3 are 45V and 5V, respectfully, delivering 90% of the output power by the flyback PFC directly, while 10% of the output power is delivered by the ripple cancellation converter. The power delivered by the flyback PFC has only been converted once. The input voltage of the ripple cancellation converter is an additional output of the flyback PFC located at the primary side, so the power delivered by ripple cancellation converter has been processed twice, Since the majority of the power delivered to the load has only been converted once, the overall efficiency of the driver embodiments is very close to that of a conventional flyback LED driver. Equation (7) describes the efficiency:

$$\eta_{new} = \frac{1}{\frac{0.9}{\eta_{PFC}} + \frac{0.1}{\eta_{PFC} \times \eta_{RCC}}} \quad (7)$$

In equation (7), $\eta_{new}$, $\eta_{PFC}$, $\eta_{RCC}$ represent the overall efficiency of the driver, the efficiency of the flyback PFC, and the efficiency of the ripple cancellation converter, respectively. From equation 7 it can be seen that if 87% efficiency is achieved by the ripple cancellation converter, the overall efficiency can achieve $0.985\eta_{PFC}$, which is very close to the efficiency of a comparable conventional flyback LED driver.

Low Component Cost

As discussed above, since the control circuit is located at the primary side, it can be implemented on a single IC, Therefore, only one controller is needed at the primary side for an isolated driver with ripple cancellation, which represents a substantial reduction in complexity and cost relative to prior designs.

EXAMPLES

Embodiments further described by way of the following non-limiting examples.

Example 1

LED Driver

Figure 7:
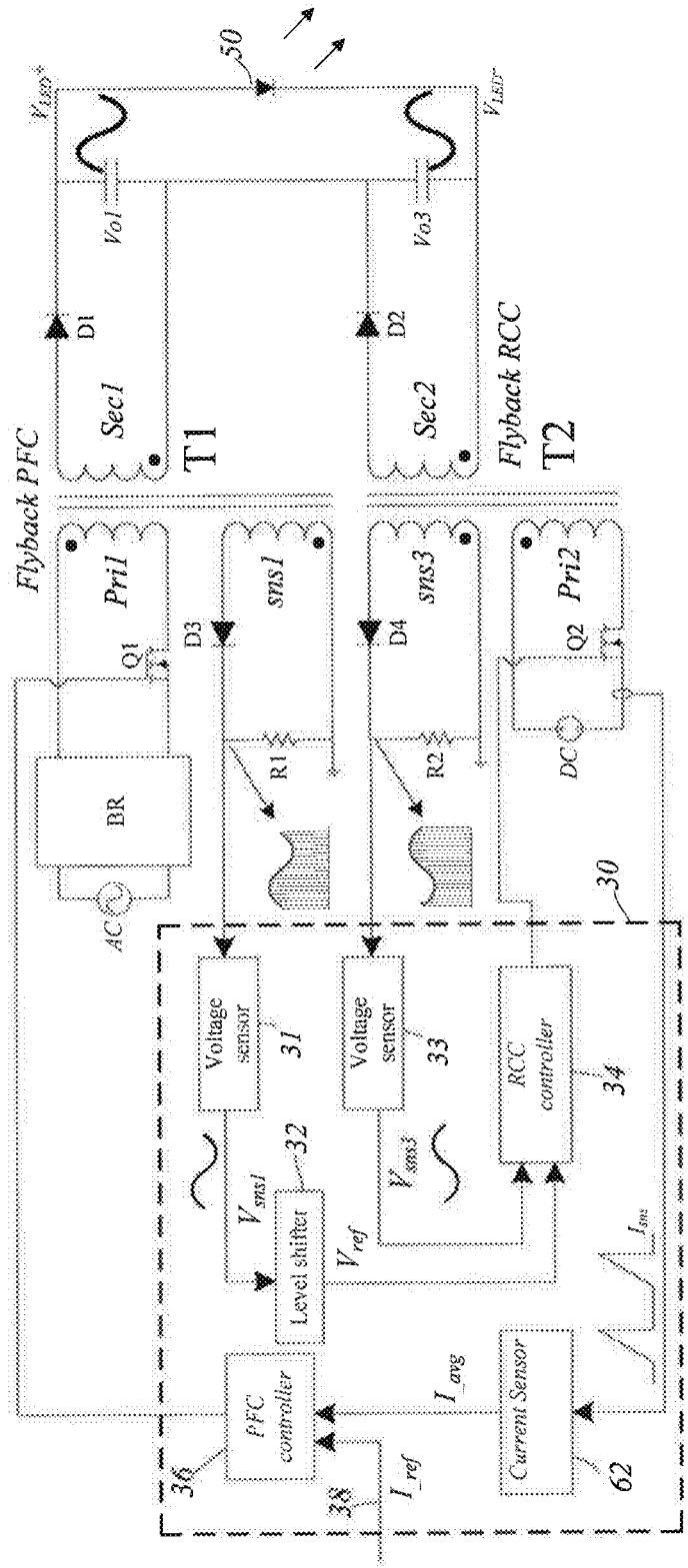
FIG. 7 is a block diagram of an embodiment of a primary side controlled LED driver with ripple cancellation as described herein.

FIG. 7 shows a block diagram of an embodiment of a primary side controlled LED driver with ripple cancellation. Vo1 and Vo3 are sensed at the primary side by sns1 winding of transformer T1 and sns3 winding of transformer T2, respectively. The LED current is sensed at the primary side via the current in transformer T2. The embodiment includes two control loops. One loop regulates the LED current and includes primary side current sensor 62 to generate I_avg, a PFC controller 36 that compares I_avg and I_ref, and generates a gating signal for primary side switch Q1 of the power circuit. The second loop controls the ripple cancellation converter output Vo3, and includes a first voltage sensor 31, a second voltage sensor 33, a level shifter 32, and RCC controller 34. The RCC controller 34 compares Vsns1 and Vsn3 and generates a gating signal for the switch Q2 of the ripple cancellation converter. The primary side controller 30 is highlighted by the dashed box. From FIG. 7 it can be seen that no secondary side control circuit and no isolation device (e.g., opto-coupler) are needed. An integrated primary side controller may be designed based on this circuit arrangement. As a result, the component cost and design complexity are reduced substantially.

Example 2

Experimental Results

A 35 W (50 V/0.7 A) experimental LED driver was built, based on the embodiment of FIG. 7, to verify the performance of the driver. The following components were used:

| Flyback PFC Section | |
| --- | --- |
| Transformer turns ratio $N_{pri}:N_{sec}$ | 38:15 |
| Primary side winding inductance ($L_{pri}$) | 470 μH |
| MOSFET Q1 | STF11NM80 |
| PFC controller | FA5601N |
| Output capacitor $C_{o1}$ | 470 μF, 63 V |
| S & H | HA5351IBZ |
| OpAmp | TLV274 |
| Ripple Cancellation Converter Section | |
| Transformer turn ratio $N_{pri}:N_{sec}$ | 1:1 |
| Primary side winding inductance | 19 μH |
| MOSFET Q2 | ZXMN4A06GTA |
| RCC input capacitor $C_{aux}$ | 160 μF, 16 V |
| RCC output capacitor $C_{o2}$ | 20 μF, 16 V |
| RCC controller | FAN6961 |
| S & H | HA5351IBZ |
| LED Load Section | |
| LED load (23 LEDs connected in series) | LR W5AM-HZJZ-1-Z |

Figure 8:
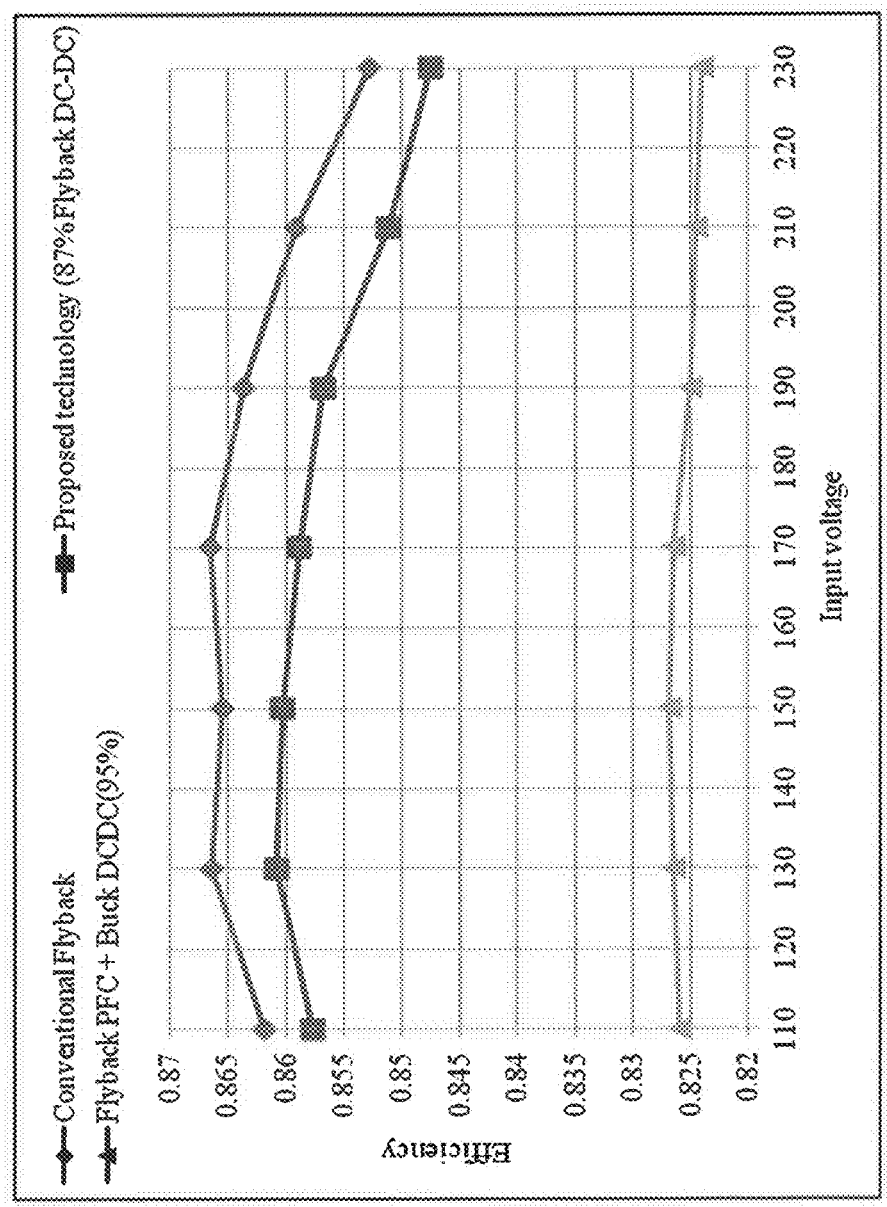
FIG. 8 is a plot comparing efficiency of an experimental LED driver based on the embodiment of FIG. 7 with a conventional flyback LED driver and a two-stage (flyback PFC+Buck DC-DC) LED driver.

In order to conduct an objective evaluation, the performance of a conventional flyback LED driver and a two-stage (flyback PFC.+Buck DC-DC) LED driver were included for comparison. The plot of FIG. 8 compares the efficiency of the three designs. The ITC circuits in three designs were identical.

As shown in FIG. 8, the efficiency of the embodiment at 110 VAC input is 3% higher than the two-stage driver. At 220 VAC input, the embodiment achieves 2% higher efficiency than the two-stage driver. Since only 10% of the output power is handled by the ripple cancellation converter in the embodiment, the overall efficiency is very close to the conventional flyback driver and much higher than the two-stage LED driver.

Figure 9A:
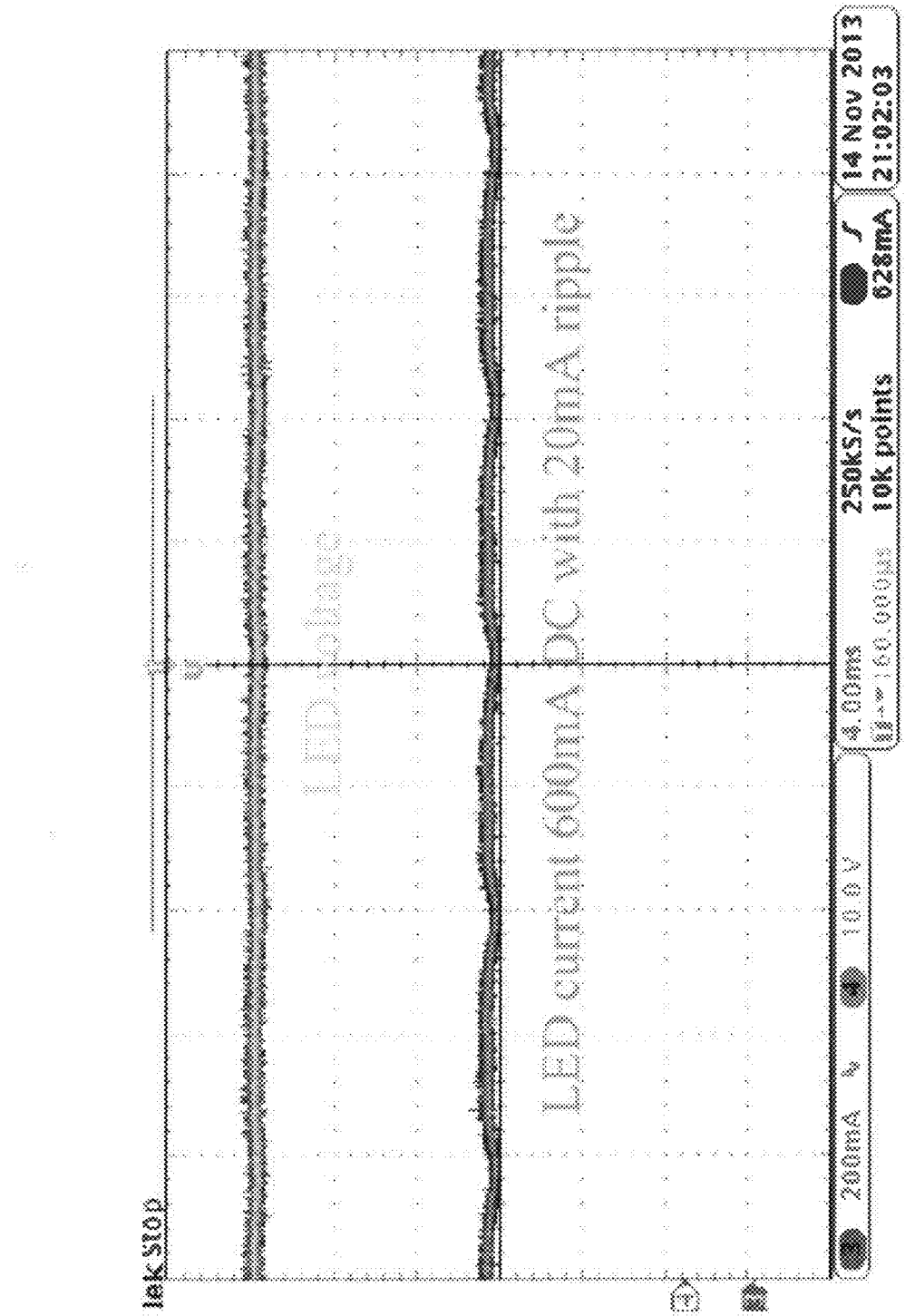
FIGS. 9A and 9B are plots of low frequency ripple current for (A) the experimental LED driver embodiment and (B) the conventional flyback LED driver.
Figure 9B:
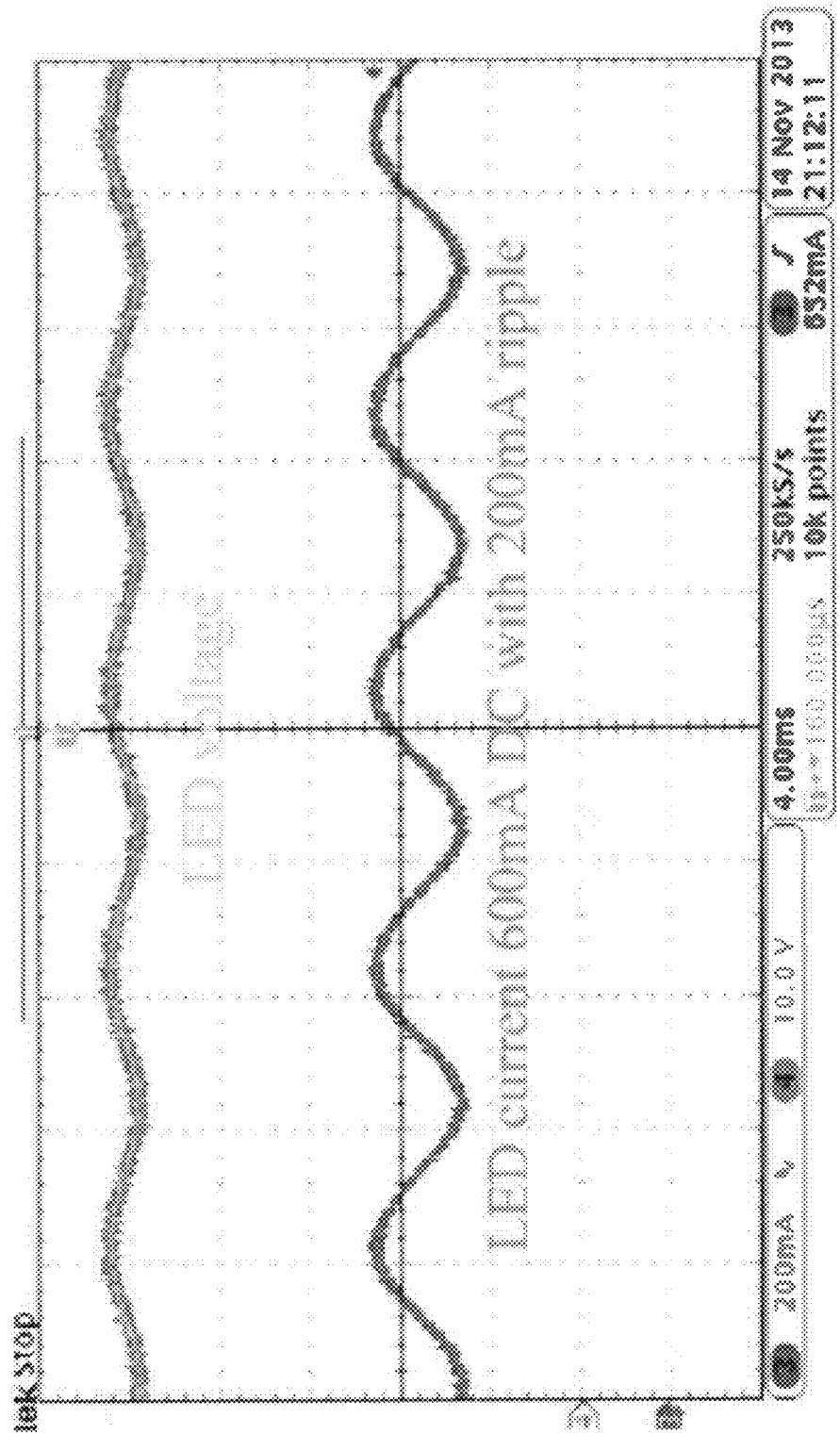

FIGS. 9A and 9B show the low frequency ripple current of the experimental embodiment and the conventional flyback LED driver. Both drivers included a 470 μF output storage capacitor. The ripple cancellation converter embodiment produced a near-DC LED current, with a low frequency ripple of only 20 mA pk-pk. In contrast, the low frequency ripple current for the conventional flyback LED driver was 200 mA pk-pk.

Figure 10:
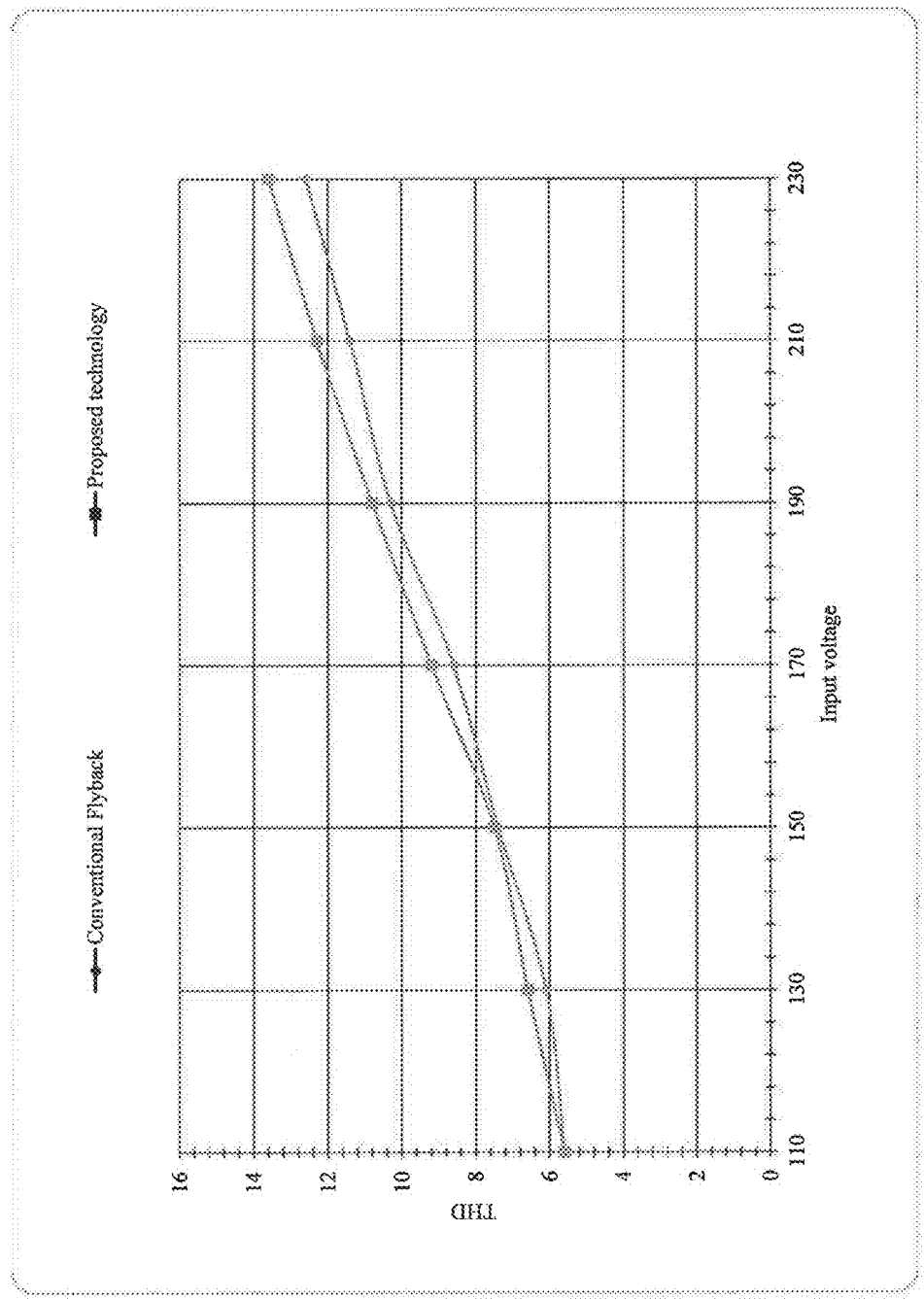
FIG. 10 is a plot of total harmonic distortion (THD) of the experimental embodiment and the conventional flyback driver.
Figure 11:
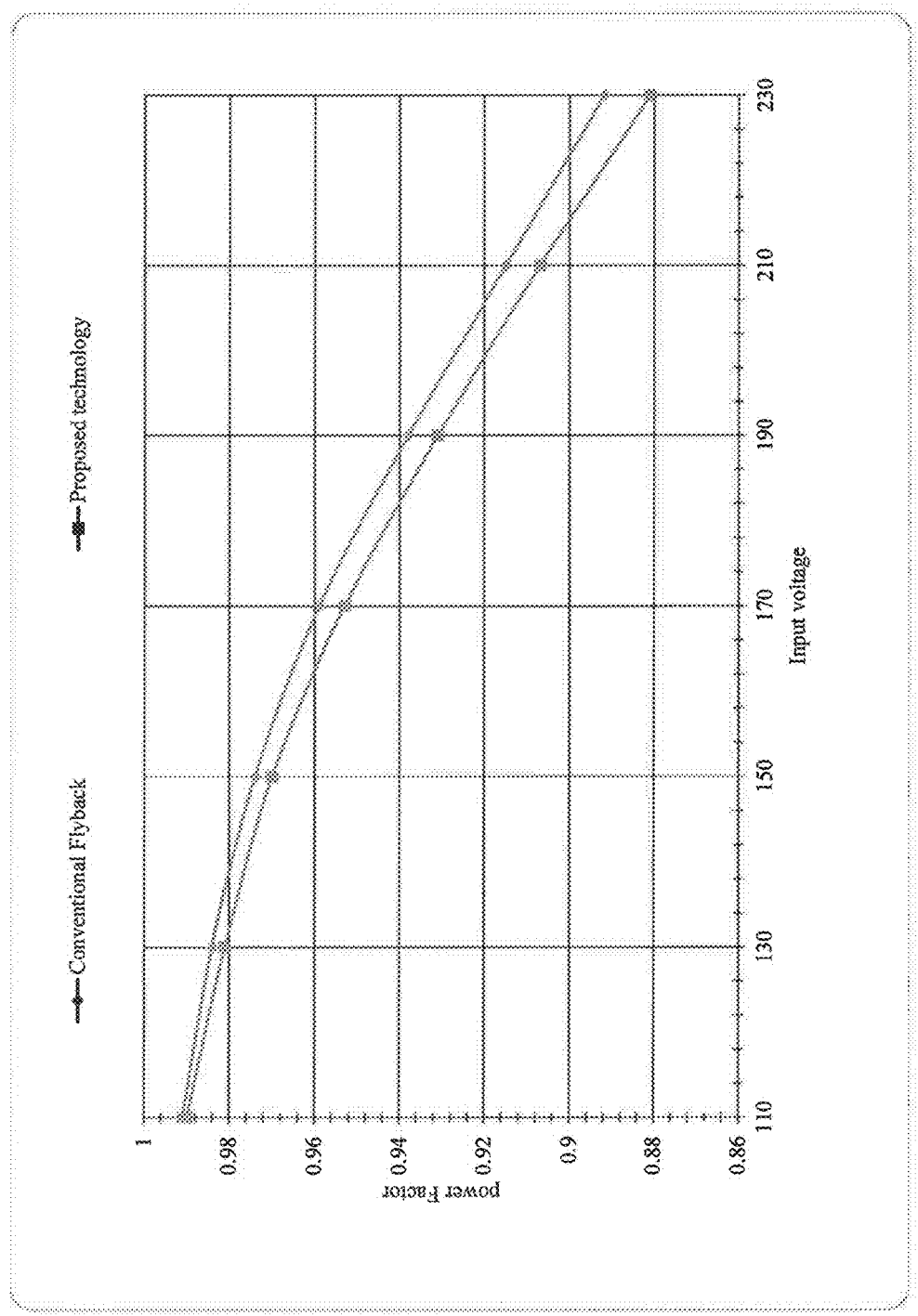
FIG. 11 is a plot of power factor of the experimental embodiment and the conventional flyback driver.

The total harmonic distortion (THD) and power factor performance of the experimental embodiment and the conventional flyback driver are compared in FIGS. 10 and 11, respectively. The plots show that the THD and power factor of the experimental embodiment were very close to the conventional flyback LED driver.

Figure 12:
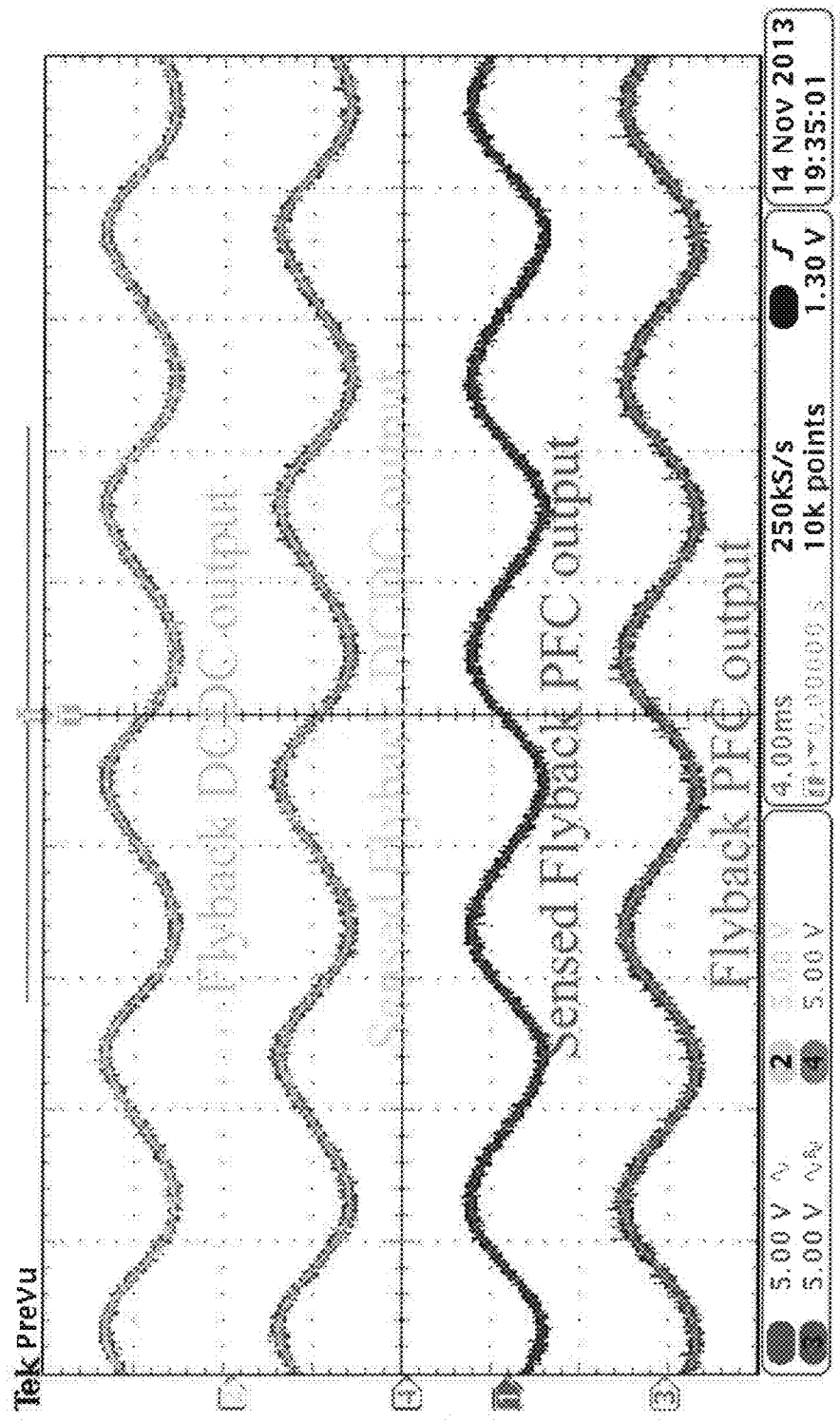
FIG. 12 is a plot of the ripple voltage sensing result of the flyback PFC output Vo1 and the ripple cancellation converter output Vo3 for the experimental embodiment.
Figures 13A, 13B:
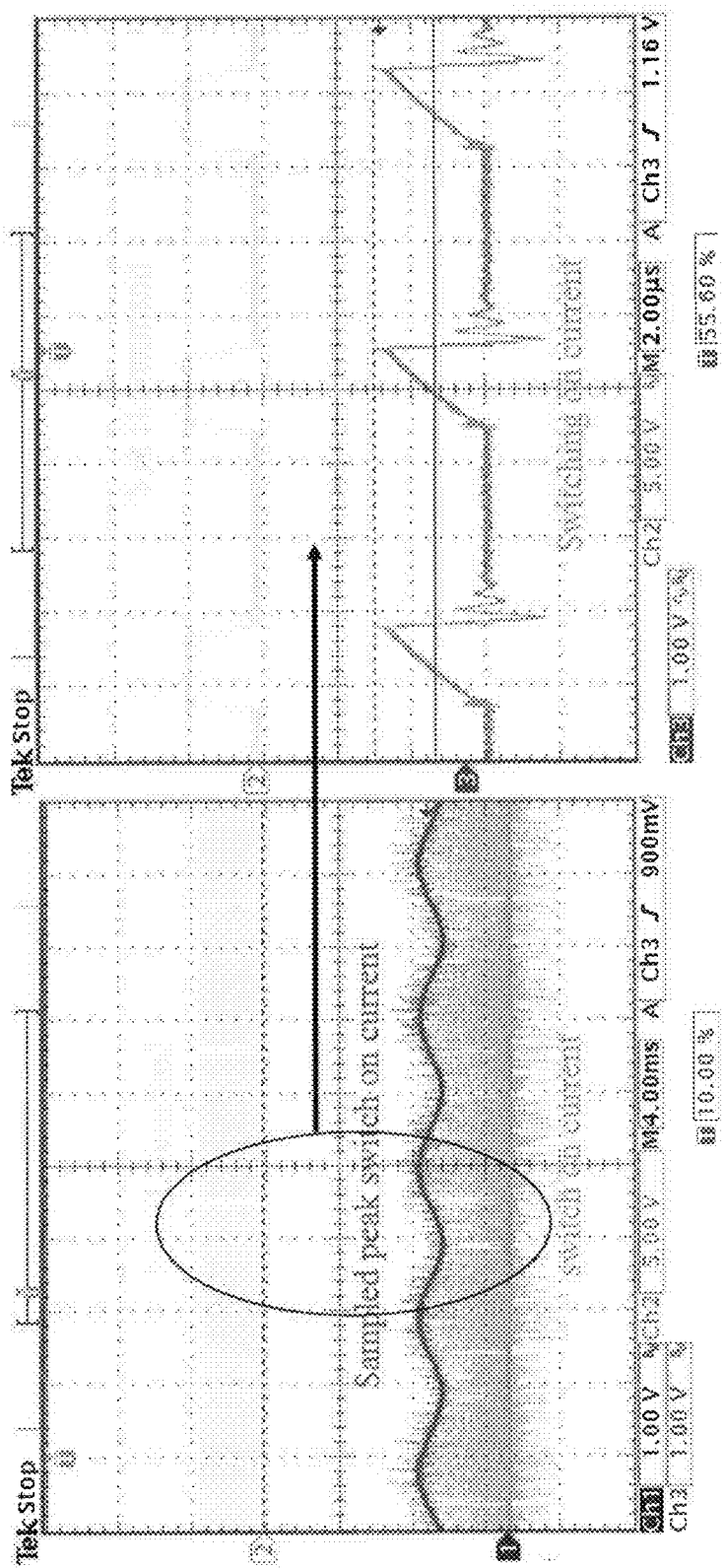
FIGS. 13A and 13B are plots of the primary side current sensing waveform for the experimental embodiment, wherein the time scale has been expanded to show the waveforms in FIG. 13B.

FIG. 12 shows the ripple voltage sensing result of the flyback FTC output Vol and the ripple cancellation converter output Vo3 for the experimental embodiment. The plot confirms that high fidelity low frequency ripple information has been retrieved at the primary side. The primary side current sensing waveform is shown in FIG. 13A. In FIG. 13B the time scale has been expanded to show the waveforms.

Equivalents

Those skilled in the art will recognize or be able to ascertain variants of the embodiments described herein. Such variants are within the scope of the invention and are covered by the appended claims.

The invention claimed is:

1. A circuit for use with a power supply including a primary input side and a secondary output side, wherein the primary input side comprises at least one first switch and the power supply provides a main output including a main DC voltage with a first AC voltage ripple or a main DC current with a first AC current ripple, the circuit comprising:

a primary side controlled isolated ripple cancellation converter comprising at least one second switch, wherein the primary side controlled isolated ripple cancellation converter:

(i) senses the first AC voltage ripple from the primary side; and uses the sensed AC voltage ripple to provide a second AC voltage ripple;

wherein the second AC voltage ripple is connected in series with the main output, such that the first AC voltage ripple is substantially cancelled; or (ii) senses the first AC current ripple from the primary side; and uses the sensed AC current ripple to provide a second AC current ripple;

wherein the second AC current ripple is connected in parallel with the main output, such that the first AC current ripple is substantially cancelled;

wherein substantially ripple-free DC output power is provided to a load.

2. The power supply of claim 1, comprising:

a power circuit comprising the at least one first switch that outputs the main DC voltage with the first AC voltage ripple or the main DC current with the first AC current ripple; and the primary side controlled isolated ripple cancellation converter.

3. The circuit of claim 1, wherein the ripple cancellation converter provides an auxiliary output comprising:

(i) an auxiliary DC voltage with the second AC voltage ripple, wherein the second AC voltage ripple is substantially equal in magnitude and substantially opposite in phase to the first AC voltage ripple;

wherein the main output and the auxiliary output are combined such that:

a total DC voltage is provided;

the second AC voltage ripple substantially cancels the first AC voltage ripple, or the total DC voltage is substantially ripple-free; or (ii) an auxiliary DC current with the second AC current ripple, wherein the second AC current ripple is substantially equal in magnitude and substantially opposite in phase to the first AC current ripple;

wherein the main output and the auxiliary output are combined such that:

a total DC current is provided;

the second AC current ripple substantially cancels the first AC current ripple, or the total DC current is substantially ripple-free.

4. The circuit of claim 1, wherein the ripple cancellation converter comprises a flyback converter or an isolated boost converter.

5. The circuit of claim 1, further comprising:
a first primary side sensor that senses the first AC voltage ripple and outputs a first sensor signal;
a second primary side sensor that senses the second AC voltage ripple and outputs a second sensor signal; and
a primary side ripple cancellation controller that uses the first and second sensor signals to control the ripple cancellation converter to shape the second AC voltage ripple.

6. The circuit of claim 1, further comprising a power factor correction circuit.

7. The circuit of claim 6, wherein operation of the power factor correction circuit is based on a feedback signal derived from a primary side load current sensor.

8. The circuit of claim 1, wherein the substantially ripple-free DC output power is variable.

9. The circuit of claim 1, wherein the power supply is an AC-DC power supply.

10. The circuit of claim 1, wherein the load comprises at least one LED.

11. A method for providing DC power from a DC power supply comprising a primary side having an AC input and at least one first switch, the DC power supply providing a main output power comprising a main DC voltage with a first AC voltage ripple or a main DC current with a first AC current ripple, the method comprising:
controlling an isolated ripple cancellation converter comprising at least one second switch from the primary side, wherein controlling comprises:
(i) sensing the first AC voltage ripple from the primary side; and
using the sensed AC voltage ripple to provide a second AC voltage ripple;
wherein the second AC voltage ripple is connected in series with the main output, such that the first AC voltage ripple is substantially cancelled; or (ii) sensing the first AC current ripple from the primary side; and
using the sensed AC current ripple to provide a second AC current ripple;
wherein the second AC current ripple is connected in parallel with the main output, such that the first AC current ripple is substantially cancelled;
wherein substantially ripple-free DC output power is provided to a load.

12. The method of claim 11, farther comprising:
(i) controlling the isolated ripple cancellation converter to output an auxiliary DC voltage with the second AC voltage ripple, wherein the second AC voltage ripple is substantially equal in magnitude and substantially opposite in phase to the first AC voltage ripple; and
combining the main output and the auxiliary DC voltage such that:
a total DC voltage is provided;
the second AC voltage ripple substantially cancels the first AC voltage ripple, or the total DC voltage is substantially ripple-free;

or (ii) controlling the isolated ripple cancellation converter to output an auxiliary DC current with the second AC current ripple, wherein the second AC current ripple is substantially equal in magnitude and substantially opposite in phase to the first AC current ripple; and
combining the main output and the auxiliary DC current such that:
a total DC current is provided;
the second AC current ripple substantially cancels the first AC current ripple, or the total DC current is substantially ripple-free.

13. The method of claim 11, further comprising:
using a first primary side sensor to sense the first AC voltage ripple and output a first sensor signal;
using a second primary side sensor to sense the second AC voltage ripple and output a second sensor signal; and
using a primary side ripple cancellation controller to shape the second AC voltage ripple based on the first and second sensor signals.

14. The method of claim 11, further comprising:
using a primary side current sensor to sense the load current and output a feedback signal; and
controlling operation of a power factor correction circuit based on the feedback signal.

15. The method of claim 11, further comprising providing variable substantially ripple-free DC output power.

16. The method of claim 11, comprising applying the method to an AC-DC power supply.

17. The method of claim 11, wherein the load comprises at least one LED.

* * * * *

UNITED STATES PATENT AND TRADEMARK OFFICE
CERTIFICATE OF CORRECTION

PATENT NO. : 10,015,848 B2
APPLICATION NO. : 15/125271
DATED : July 3, 2018
INVENTOR(S) : Peng Fang and Yan-Fei Liu It is certified that error appears in the above-identified patent and that said Letters Patent is hereby corrected as shown below:

In the Specification

Column 7, Line 6: replace "In equation (5), Nsns and Nsec represent he turns of the" with
--In equation (5), Nsns and Nsec represent the turns of the--

Column 9, Line 53: replace "the three designs. The ITC circuits in three designs were" with
--the three designs. The PFC circuits in three designs were--

Column 10, Line 11: replace "flyback FTC output Vol and the ripple cancellation converter" with
--flyback PFC output Vol and the ripple cancellation converter--

In the Claims

Column 12, Claim 12, Line 10: replace "12. The method of claim 11, farther comprising:" with
--12. The method of claim 11, further comprising:--

Signed and Sealed this
Fifth Day of November, 2019

Andrei Iancu
*Director of the United States Patent and Trademark Office*